`US012212750B2`

(12) United States Patent
Kim et al.

(10) Patent No.: US 12,212,750 B2
(45) Date of Patent: Jan. 28, 2025

(54) SYSTEMS AND METHODS FOR CODING TRANSFORM DATA

(71) Applicant: Sharp Kabushiki Kaisha, Sakai (JP)

(72) Inventors: Seung-Hwan Kim, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/538,594

(22) Filed: Dec. 13, 2023

(65) Prior Publication Data
US 2024/0114139 A1    Apr. 4, 2024

Related U.S. Application Data

(63) Continuation of application No. 18/119,632, filed on Mar. 9, 2023, now Pat. No. 11,902,523, which is a continuation of application No. 17/149,926, filed on Jan. 15, 2021, now Pat. No. 11,638,005, which is a continuation of application No. 16/098,251, filed as application No. PCT/JP2017/016392 on Apr. 25, 2017, now Pat. No. 10,931,947.

(60) Provisional application No. 62/331,935, filed on May 4, 2016.

(51) Int. Cl.
| | | |
|---|---|---|
| *H04N 19/132* | (2014.01) |
| *H04N 19/12* | (2014.01) |
| *H04N 19/122* | (2014.01) |
| *H04N 19/159* | (2014.01) |
| *H04N 19/176* | (2014.01) |
| *H04N 19/18* | (2014.01) |
| *H04N 19/61* | (2014.01) |
| *H04N 19/70* | (2014.01) |

(52) U.S. Cl.
CPC .......... *H04N 19/12* (2014.11); *H04N 19/122* (2014.11); *H04N 19/159* (2014.11); *H04N 19/176* (2014.11); *H04N 19/18* (2014.11); *H04N 19/61* (2014.11); *H04N 19/70* (2014.11)

(58) Field of Classification Search
CPC .... H04N 19/12; H04N 19/122; H04N 19/159; H04N 19/176; H04N 19/18; H04N 19/61; H04N 19/70
See application file for complete search history.

(56) References Cited

U.S. PATENT DOCUMENTS

| | | | | |
|---|---|---|---|---|
| 10,931,947 B2* | 2/2021 | Kim | ............ | H04N 19/176 |
| 11,330,302 B2* | 5/2022 | Jung | ............ | H04N 19/132 |
| 11,736,729 B2* | 8/2023 | Jung | ............ | H04N 19/70 |
| | | | | 375/240.12 |

OTHER PUBLICATIONS

Kim et al., "Devices and Methods for Coding Transform Data", U.S. Appl. No. 18/119,632, filed Mar. 9, 2023.

* cited by examiner

*Primary Examiner* — Howard D Brown, Jr.
(74) *Attorney, Agent, or Firm* — Keating & Bennett, LLP

(57) ABSTRACT

A video coding device may be configured to perform transform data coding according to one or more of the techniques described herein.

4 Claims, 9 Drawing Sheets

Pseduocode for N x N mode

```
CU_Level_FLAG_OR_IDX              // Conditioned on CU parameters
    TB₀,₀_Coefficients_Y
        TU₀,₀_IDX_OR_FLAG         // Conditioned on TU₀,₀ parameters
    TB₁,₀_Coefficients_Y
        TU₁,₀_IDX_OR_FLAG         // Conditioned on TU₁,₀ parameters
    TB₀,₁_Coefficients_Y
        TU₀,₁_IDX_OR_FLAG         // Conditioned on TU₀,₁ parameters
    TB₁,₁_Coefficients_Y
        TU₁,₁_IDX_OR_FLAG         // Conditioned on TU₁,₁ parameters
    TB_Coefficients_Cb
    TB_Coefficients_Cr
```

FIG. 6A

Pseduocode for 2N x 2N mode

```
CU_Level_FLAG_OR_IDX              // Conditioned on CU parameters
    TB_Coefficients_Y
        CU_IDX_OR_FLAG            // Conditioned on TU parameters
    TB_Coefficients_Cb
    TB_Coefficients_Cr
```

FIG. 6B

Pseduocode for N x N mode parsing using TU_MAP values

```
If (TU_MAP >15)
    {
        Parse TU₀₀ NSST index;
        TU_MAP -=16;            // TU_MAP is decreased by 16
    }
If (TU_MAP >7)
    {
        Parse TU₁₀ NSST index;
        TU_MAP -=8;             // TU_MAP is decreased by 8
    }
If (TU_MAP >3)
    {
        Parse TU₀₁ NSST index;
        TU_MAP -=4;             // TU_MAP is decreased by 4
    }
If (TU_MAP >1)
    {
        Parse TU₁₁ NSST index;
        TU_MAP -=2;             // TU_MAP is decreased by 2
    }
```

FIG. 9

SYSTEMS AND METHODS FOR CODING TRANSFORM DATA

CROSS REFERENCE

This Nonprovisional application claims priority under 35 U.S.C. § 119 on provisional Application No. 62/331,935 on May 4, 2016, the entire contents of which are hereby incorporated by reference.

TECHNICAL FIELD

This disclosure relates to video coding and more particularly to techniques for transform coefficient coding.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC: MPEG-4 AVC) and High-Efficiency Video Coding (HEVC). HEVC is described in High Efficiency Video Coding (HEVC), Rec. ITU-T H.265 October 2014, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 2 (JEM 2), Algorithm Description of Joint Exploration Test Model 2 (JEM 2), ISO/IEC JTC1/SC29/WG11/N16066, February 2016, San Diego, CA, US, which is incorporated by reference herein, describes the coding features that are under coordinated test model study by the JVET as potentially enhancing video coding technology beyond the capabilities of ITU-T H.265. It should be noted that the coding features of JEM 2 are implemented in JEM reference software maintained by the Fraunhofer research organization. Currently, the updated JEM reference software version 2 (JEM 2.0) is available. As used herein, the term JEM is used to collectively refer to algorithm descriptions of JEM 2 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for transform coefficient coding. It should be noted that although techniques of this disclosure are described with respect to ITU-T H.264, ITU-T H.265, and JEM, the techniques of this disclosure are generally applicable to video coding. For example, transform coefficient video coding techniques that are described herein with respect to ITU-T H.265 may be generally applicable to video coding. For example, the coding techniques described herein may be incorporated into video coding systems (including video coding systems based on future video coding standards) including block structures, intra prediction techniques, inter prediction techniques, transform techniques, filtering techniques, and/or entropy coding techniques other than those included in ITU-T H.265, Thus, reference to ITU-T H.264, ITU-T H.265, and/or JEM is for descriptive purposes and should not be construed to limit the scope to of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the terms is used herein, the term should be interpreted in a manner that broadly includes each respective definition and/or in a manner that includes each of the particular definitions in the alternative.

An aspect of the invention is a method of encoding transform data, the method comprising: determining whether a secondary transform is applied to a sub-group of transforms coefficients; signaling a syntax element indicating a whether the secondary transform is applied to the sub-group of transforms coefficients; and signaling a syntax element indicating a matrix for the secondary transform based on the value of a syntax element indicating a whether the secondary transform is applied to the sub-group of transforms coefficients.

An aspect of the invention is a method for decoding video data, the method comprising: receiving secondary transform data; and reconstructing residual data based on secondary transform data.

BRIEF DESCRIPTION OF DRAWINGS

FIG. 6A is a conceptual drawing illustrating an example of pseudocode that may be used to generate syntax or semantics used for video coding according to one or more techniques of this disclosure.

FIG. 6B is a conceptual drawing illustrating an example of pseudocode that may be used to generate syntax or semantics used for video coding according to one or more techniques of this disclosure.

FIG. 9 is a conceptual drawing illustrating an example of pseudocode that may be used to parse syntax or semantics used for video coding according to one or more techniques of this disclosure.

DESCRIPTION OF EMBODIMENTS

Figure 1:
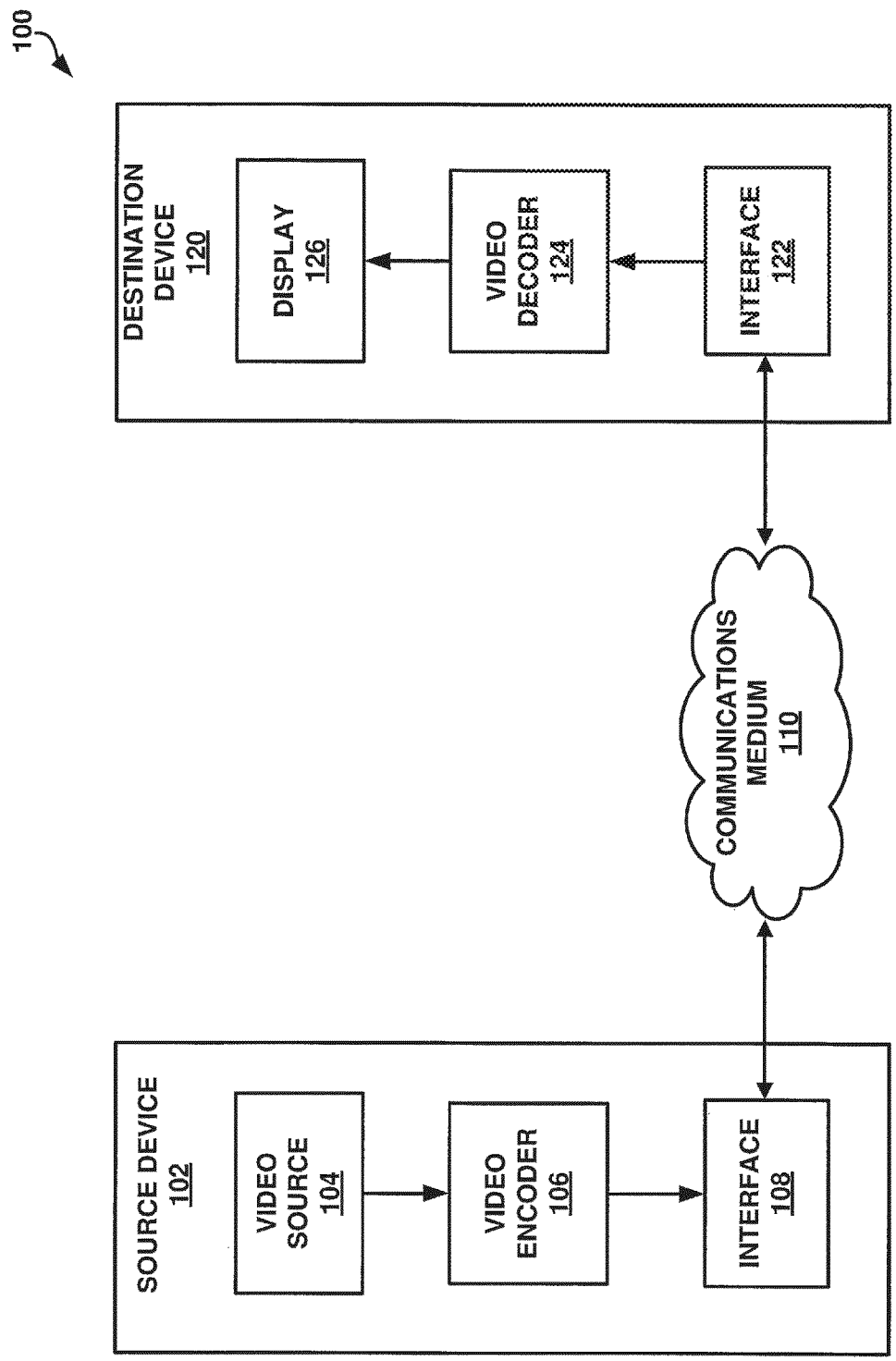
FIG. 1 is a block diagram illustrating an example of a system that may be configured to encode and decode video data according to one or more techniques of this this disclosure.

Video content typically includes video sequences comprised of a series of frames. A series of frames may also be referred to as a group of pictures (GOP). Each video frame or picture may include a plurality of slices or tiles, where a slice or tile includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. JEM specifies a CTU having a maximum size of 256×256 luma samples. As used herein, the term video block may generally refer to an area of a picture or may more specifically refer to the largest array of pixel values that may be predictively coded, sub-divisions thereof, and/or corresponding structures.

In ITU-T H.265, the CTBs of a CTU may be partitioned into Coding Blocks (CB) according to a corresponding quadtree block structure. In JEM, CTBs may be further partitioned according to a binary tree structure. That is, JEM specifies a quadtree plus binary tree (QTBT) block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level and for a CU one or more predictions corresponding to intra prediction or inter prediction may be used to generate reference samples for CBs of the CU. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples. In JEM, the binary tree structure enables square and rectangular binary tree leaf nodes, which are referred to as Coding Blocks (CBs). Further, in JEM, luma and chroma components may have separate QTBT structures. The difference between sample values included in a CB (e.g., a luma CB) and associated reference samples (e.g., indicated using one or more PBs) may be referred to as residual data.

Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Similarly, in JEM, residual values corresponding to a CB may be used to generate transform coefficients using a TU structure. In JEM, an Adaptive Multiple Transform (AMT) scheme may be used for generating transform coefficients. An AMT scheme may include generating transform coefficients using a transform set, where a transform set includes one or more defined transform matrices. Transform matrices may correspond to one of the eight versions of DCT or one of the eight versions of DST, where the eight versions of DCT and the eight versions of DST form the family of discrete trigonometric transforms. Further, in some examples, transform matrices may correspond to specific approximations of a version of a discrete transform. In one example, particular transform sets may correspond to intra prediction modes. Further, in JEM, a core transform and a subsequent secondary transform may be applied to generate transform coefficients. Further, whether a subsequent secondary transform is applied to generate transform coefficients may be dependent on a prediction mode.

Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data may associate an area of a picture with corresponding reference samples. For intra prediction coding, an intra prediction mode may specify the location of reference samples within a picture. In ITU-T H.265, defined possible intra prediction modes include a planar (i.e., surface fitting)

prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMocie: 1), and 65 angular prediction modes (predMode: 2-66). It should be noted that planar and DC prediction modes may be referred to as non-directional prediction modes and the angular prediction modes may be referred to as directional prediction modes. In ITU-T H.265, for a current prediction block, one of the 35 possible intra prediction modes may be derived by inferring an intra prediction mode from a neighboring intra predicted prediction unit. In JEM, in a manner similar to ITU-T H.265, one of the 67 possible intra prediction modes may be derived by inferring an intra prediction mode from a neighboring intra predicted prediction unit or through signaling a remaining prediction mode. In addition to generating a prediction block according to a prediction mode, intra prediction techniques may include generating a predictive video block using a weighted combination of unfiltered and filtered reference samples. One example technique for generating a predictive video block using a weighted combination of unfiltered and filtered reference samples includes so-called Position Dependent Intra Prediction (PDPC) described in JEM. It should be noted that in JEM, a CU-level (i.e., signaled once per CU) flag, PDPC_idx, indicates whether PDPC is applied or not for each PU included in the CU, where a value of 1 for PDPC_idx indicates the PDPC is applied. It should be noted that the techniques described herein may be generally applicable regardless of the number of defined possible prediction modes.

As described above, intra prediction data or inter prediction data may associate an area of a picture with corresponding reference samples. For inter prediction coding, a motion vector (MV) may identify reference samples in a picture other than the picture of a video block to be coded and thereby exploits temporal redundancy in video. For example, a current video block may be predicted from a reference block located in a previously coded frame and a motion vector may be used to indicate the location of the reference block. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, residual data generated for an area of a picture using a prediction and corresponding reference samples may be transformed to generate transform coefficients. As further described above, in JEM, whether a subsequent secondary transform is applied to generate transform coefficients may be dependent on a prediction mode. Transform coefficients may be generated using transform matrices associated with a transform set. In JEM, one of 12 transform sets is mapped to the 67 intra prediction modes described above, where each set for non-directional modes includes two transform matrices and each set for directional modes includes three transform matrices. Table 1 illustrates how one of the 12 transform sets (i.e., Sets 0 to 11) are mapped to prediction modes in JEM.

TABLE 1

| Intra mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Set Index | 0 | 0 | 1 | 2 | 1 | 2 | 1 | 2 | 3 | 4 | 3 | 4 | 3 | 4 | 5 | 5 | 5 | 6 | 6 |
| Intra mode | 19 | 20 | 21 | 22 | 23 | 24 | 25 | 26 | 27 | 28 | 29 | 30 | 31 | 32 | 33 | 34 | 35 | 36 | 37 |
| Set Index | 6 | 7 | 7 | 7 | 8 | 9 | 8 | 9 | 8 | 9 | 10 | 11 | 10 | 11 | 10 | 11 | 10 | 11 | 10 |
| Intra mode | 38 | 39 | 40 | 41 | 42 | 43 | 44 | 45 | 46 | 47 | 48 | 49 | 50 | 51 | 52 | 53 | 54 | 55 | 56 |
| Set Index | 11 | 10 | 9 | 8 | 9 | 8 | 9 | 8 | 7 | 7 | 7 | 6 | 6 | 6 | 5 | 5 | 5 | 4 | 3 |
| Intra mode | 57 | 58 | 59 | 60 | 61 | 62 | 63 | 64 | 65 | 66 | | | | | | | | | |
| Set Index | 4 | 3 | 4 | 3 | 2 | 1 | 2 | 1 | 2 | 1 | | | | | | | | | |

In JEM, applying a subsequent secondary transform includes performing a secondary transform independently for each 4×4 sub-group of transform coefficients (i.e., transform coefficients generated using a core or initial transform), performing a secondary transform independently may be referred to as applying Non-Separable Secondary Transform (NSST). In JEM, a 2-bit CU-level index value is included in the bitstream to indicate a transform matrix for a transform set of a secondary transform. It should be noted that in JEM, the 2-bit CU-level index value is signaled once per CU and is included in a bitstream after the corresponding transform coefficients. Further, in JEM, a value of zero for the 2-bit CU-level index value indicates that a secondary transform is not applied to the current CU. Thus, in JEM, the 2-bit CU-level index value is used to indicate a transform matrix for a transform set of a secondary transform, where the 2-bit CU-level index value has a value of 0, 1, or 2 for the DC and planar prediction modes and has a value of 0, 1, 2, or 3 for the directional prediction modes. Thus, in JEM, for all TUs within a CU, a secondary transform is either not applied (i.e., the 2-bit CU-level index value has a value of 0) or for each 4×4 coefficient sub-block in each TU of the CU, the same 4×4 non-separable secondary transform is applied (i.e., a value of 1, 2, or 3 identifies a single transform matrix). Further, it should be noted that in JEM, NSST is only enabled when PDPC is not applied (i.e., the value of PDPC_idx is set equal to zero).

As described above, syntax elements may be entropy coded according to an entropy encoding technique. As described above, a binarization process may be performed on syntax elements as part of an entropy coding process. Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. After binarization, a CABAC entropy encoder may select a context model. For a particular bin, a context model may be selected from a set of available context models associated with the bin. In some examples, a context model may be selected based on a previous bin and/or values of previous syntax elements. For example, a context model may be selected based on the value of a neighboring intra prediction mode. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model. It should be noted that some syntax elements may be entropy encoded using arithmetic encoding without the usage of an explicitly assigned context model, such coding may be referred to as bypass coding.

Zhou et al., "TU-level non-separable secondary transform," Document: JVET-B0059Joint Video Exploration Team (JVET) of ITU-T SG 16 WP 3 and ISO/IEC ITC 1/SC 29/WG 11 2nd Meeting: San Diego, USA, 20-26 Feb. 2016, (hereinafter "JVET-B0059"), which is incorporated by reference herein, describes a variation on the NSST technique described in JEM. In JVET-B0059, for each TU in a CU a one-hit flag is signalled to indicate whether the secondary transform is applied. In JVET-B0059, a value of 0 for the one-bit flag indicates that for the TU, the secondary transform is not applied. Further, in JVET-B0059 a value of 1 for the one-bit flag indicates that a secondary transform is applied. In JVET-B0059, a set of matrices for a secondary transform is further identified by the intra prediction mode and an particular matrix with the set is inferred based syntax elements associated with a so-called Enhanced Multiple Transform (EMT). JVET-B0059 provides that for EMT there are 35 transform sets mapped to 67 intra prediction modes and each transform set includes 5 usage cases. Table 2 illustrates how one of the 5 usages cases are indicated for a TU in JVET-B0059 using syntax elements EMT CU-level flag and EMT TU-level index.

TABLE 2

| | EMT CU-level flag | | | | |
|---|---|---|---|---|---|
| | 0 | 1 | | | |
| | | EMT TU-level index | | | |
| | NULL | 0 | 1 | 2 | 3 |
| Usage case | 0 | 1 | 2 | 3 | 4 |

Thus, in JVET-B0059 a TU-level flag is used to indicate whether a secondary transform is applied for a TU, and an EMT CU-level flag and an EMT TU-level index are used to infer one of four secondary transforms within a given transform set corresponding to a prediction mode. It should be noted that in JVET-B0059, each of EMT CU-level flag and an EMT TU-level index are conditional signaled when a CU size is less than or equal to 32×32. Signaling of a transform matrix for a transform set for a secondary transform using a 2-bit CU-level index value as provided in JEM and signaling a TU-level flag to indicate whether a secondary transform is applied for a TU, and inferring an index value for a transform matrix based on EMT signaling as provided in JVET-B0059 may be less than ideal.

The techniques described herein may be used to perform transform coefficient coding. In one example, the techniques described herein may be used to more efficiently indicate whether or not a secondary transform is applied to one or more subgroups of core transform coefficients corresponding to a CU and indicate a matrix for a secondary transform. It should be noted that because a video sequence may include several pictures that are coded using intra prediction techniques, by more efficiently performing coding of transform data associated with residual data generated using intra prediction coding, overall coding efficiency may be improved using one or more of the techniques described herein.

FIG. 1 is a block diagram illustrating an example of a system that may be configured to code (i.e., encode and/or decode) video data according to one or more techniques of this disclosure. System 100 represents an example of a system that may code syntax elements according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 2:
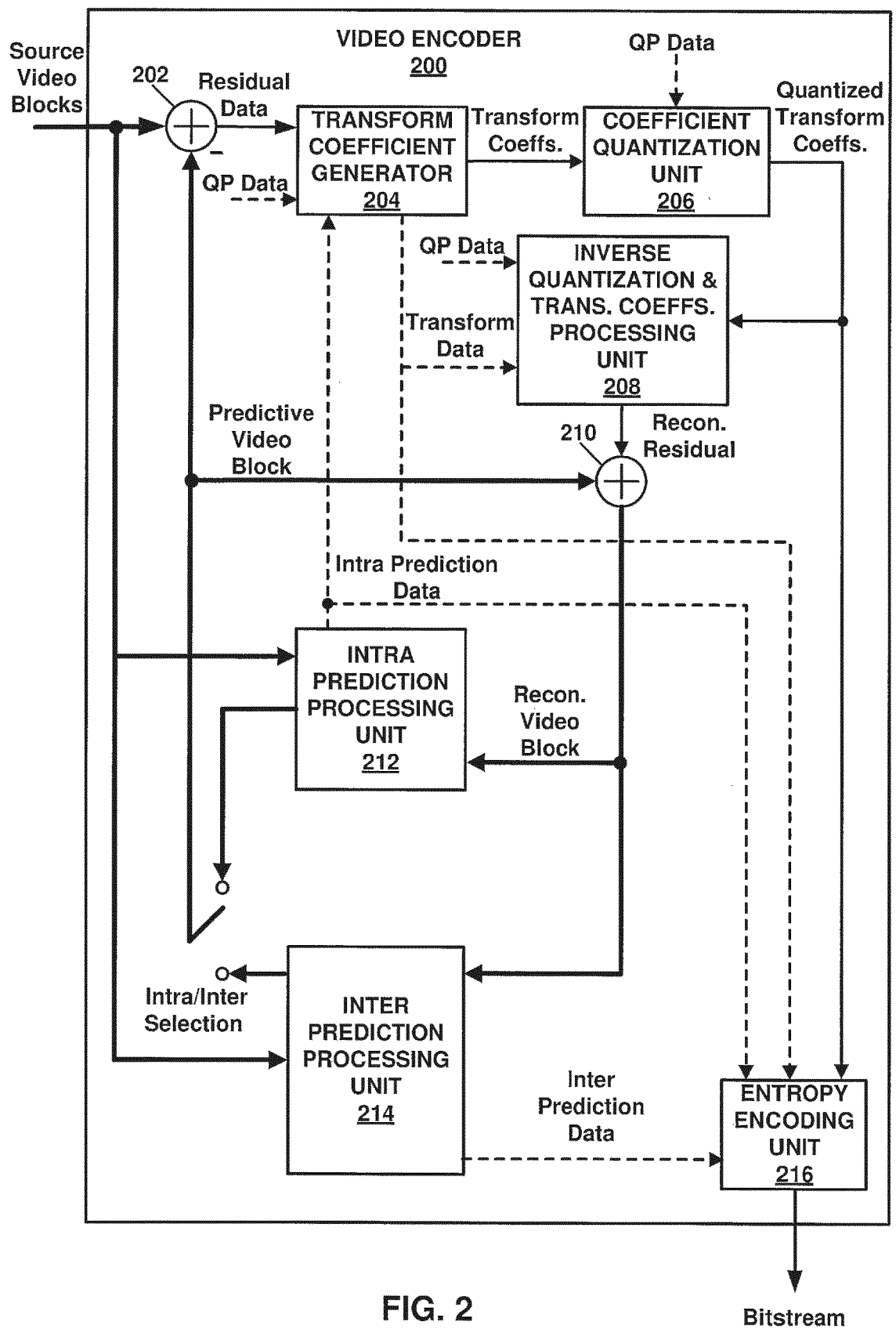
FIG. 2 is a block diagram illustrating an example of a video encoder that may be configured to encode video data according to one or more techniques of this disclosure.

FIG. 2 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode transform data.

Video encoder 200 may perform intra prediction coding and inter prediction coding of picture areas, and, as such, may be referred to as a hybrid video encoder. In the example illustrated in FIG. 2, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that the techniques described herein are generally applicable to video coding, regardless of how source video data is partitioned prior to and/or during encoding. In the example illustrated in FIG. 2, video encoder 200 includes summer 202, transform coefficient generator 204, coefficient quantization unit 206, inverse quantization and transform coefficient processing unit 208, summer 210, intra prediction processing unit 212, inter prediction processing unit 214, and entropy encoding unit 216. As illustrated in FIG. 2, video encoder 200 receives source video blocks and outputs a bitstream.

In the example illustrated in FIG. 2, video encoder 200 may generate residual data by subtracting a predictive video block from a source video block. The selection of a predictive video block is described in detail below. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms, including approximations thereof.

Further, transform coefficient generator 204 may be configured to perform a core transform and one or more subsequent secondary transforms. As described above with respect to JEM and JVET-B0059, in the case where a subsequent secondary transform is performed transform sets including transform matrices may be mapped to the intra prediction modes. Transform coefficients may be generated with a secondary transform using the transform matrices associated with a transform set. Transform coefficient generator 204 may be configured to subsequently apply secondary transform using a transform matrices associated with a transform set to transform coefficients generated using a core transform. In one example, applying a subsequent core secondary transform may include performing a secondary transform independently for each 4×4sub-group of transform coefficients, as described above. It should be noted that in some examples other sizes of sub-groups may be used (e.g., 8×8 sub-groups) for secondary transforms.

In one example, transform coefficient generator 204 may be configured to apply the NSST as described above with respect to JEM. In one example, in a manner to similar to that described above, a transform matrix used for a secondary transform may be based on an intra prediction mode. In one example, transform coefficient generator 204 may be configured to apply the NSST described above, or another type of subsequent secondary transform, using a matrix based on an intra prediction mode associated with a CU. It should be noted that the techniques described herein may be generally applicable regardless of the number of intra predication modes (e.g., the number of intra predication modes may be any number between 35-67, greater than 67, etc.) and the number of transform matrices included in a set corresponding to a particular intra prediction mode (e.g., each set may include any number of 1 to 8 transform matrices). Further, in one example, transform coefficient generator 204 may be configured to apply the NSST described above, or another subsequent transform, for a set of intra prediction modes independent of whether PDPC is applied. Further, it should be noted that the techniques described herein may be generally applicable to the case where secondary transforms are used to generate transform coefficients from residual data using inter prediction techniques.

As illustrated in the example of FIG. 2, transform coefficient generator 204 is configured to receive intra prediction data and quantization parameter (QP) data. Quantization parameter data is described in further detail below. In this manner, transform coefficient generator 204 may be configured to perform one of more transforms (e.g., a core transform and one or more subsequent secondary transforms) based on an intra prediction mode and/or a level of quantization. Transform coefficient generator 204 may output transform coefficients to coefficient quantization unit 206. Further, as illustrated in FIG. 2, transform coefficient generator 204 may output transform data, for example, an index value indicating a transform matrix within a set of transform matrices, to inverse quantization and transform coefficient processing unit 208 and entropy encoding unit 218. Coefficient quantization unit 206 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 2, quantized transform coefficients (which may be referred to as level values) are output to inverse quantization and transform coefficient processing unit 208. Inverse quantization and transform coefficient processing unit 208 may be configured to apply an inverse quantization and an inverse transformation to generate reconstructed residual data. As illustrated in FIG. 2, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Figure 3:
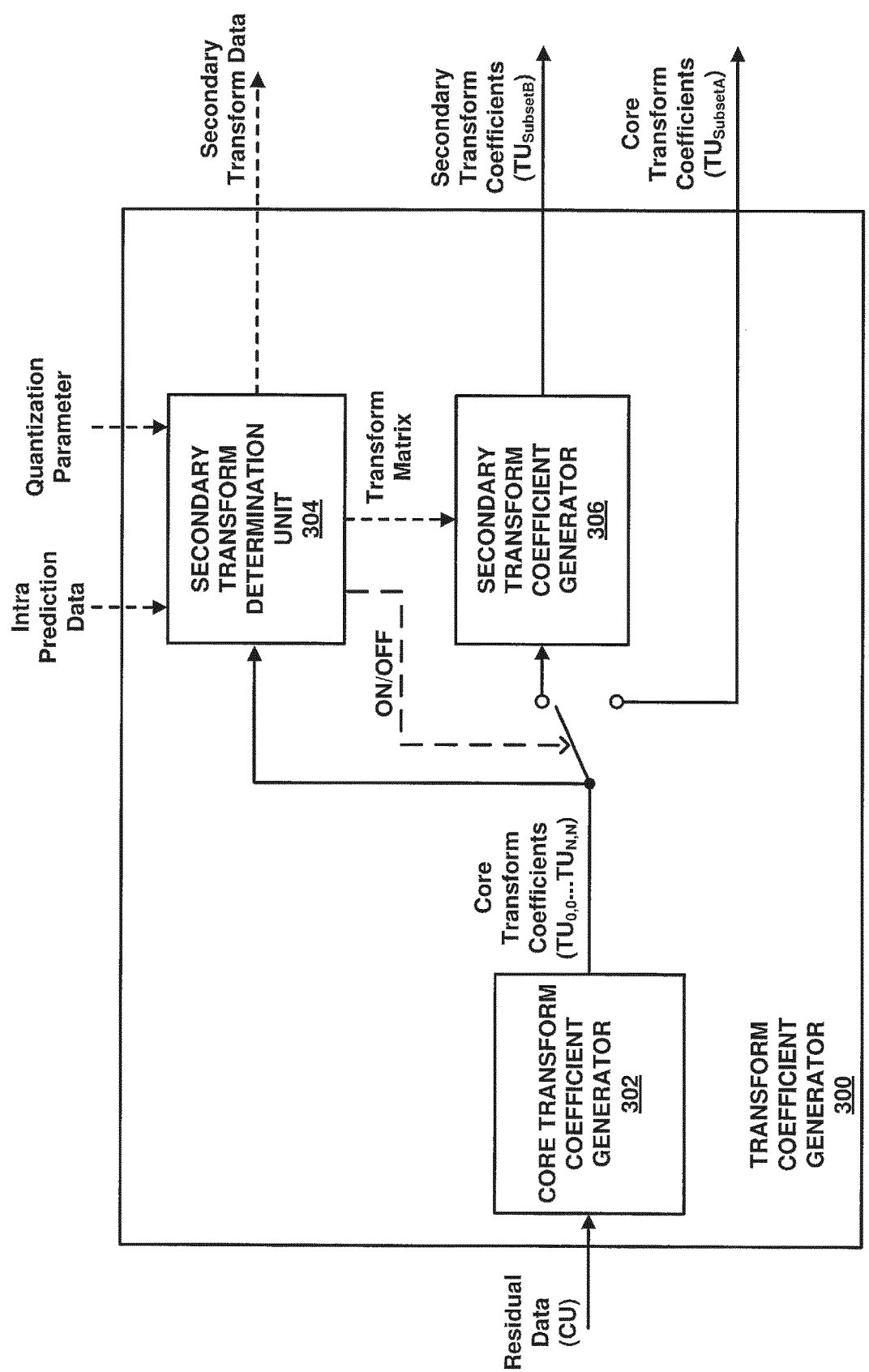
FIG. 3 is a block diagram illustrating an example of an transform coefficient generator that may be configured to encode video data according to one or more techniques of this disclosure.
Figure 4:
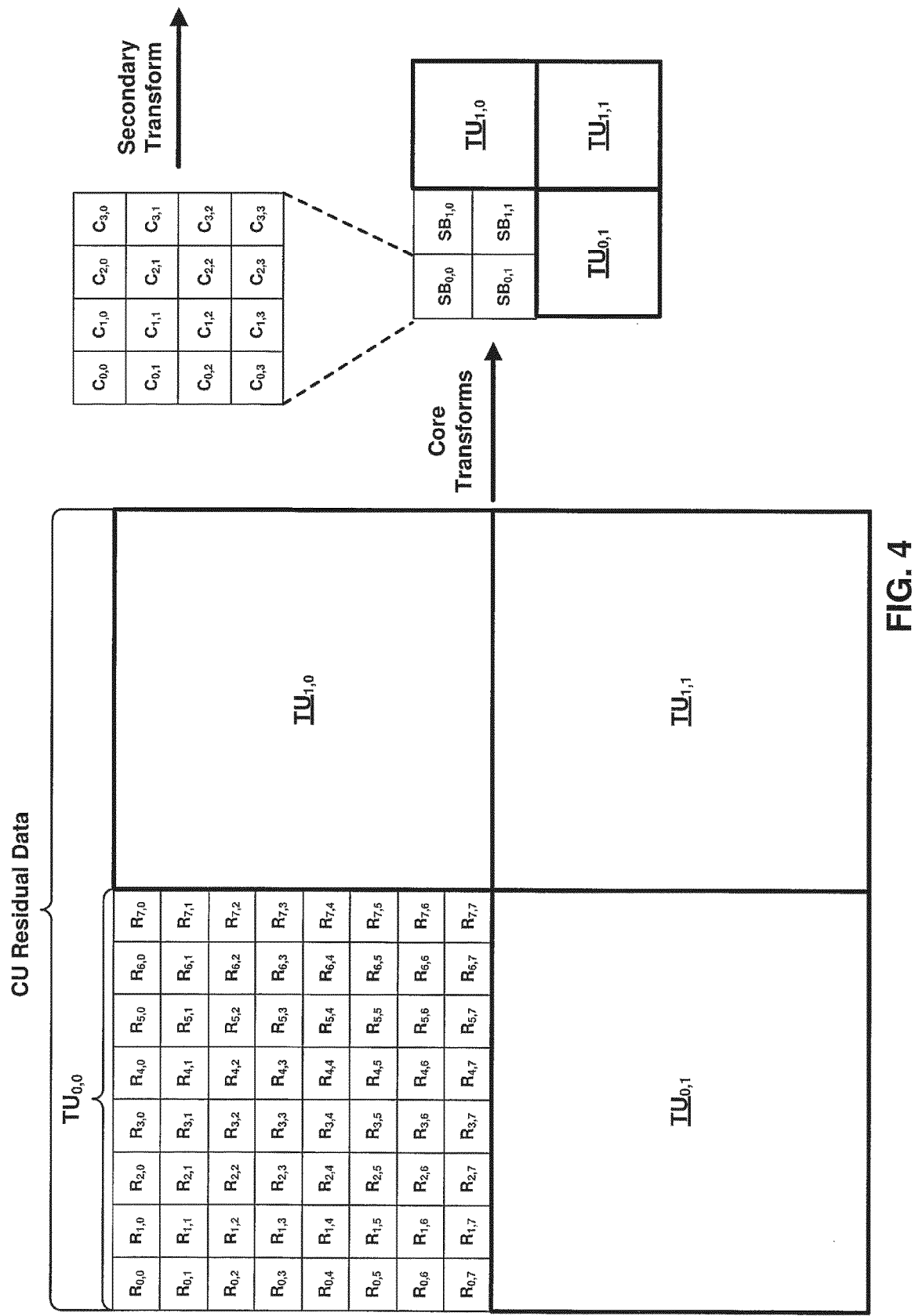
FIG. 4 is a conceptual diagram illustrating an example of transform coefficient coding according to one or more techniques of this disclosure.

FIG. 3 is a block diagram illustrating an example of an transform coefficient generator that may be configured to encode video data according to one or more techniques of this disclosure. As illustrated in FIG. 3, transform coefficient generator 300 includes core transform coefficient generator 302, secondary transform determination unit 304, and secondary transform coefficient generator 306. Core transform coefficient generator 302 may be configured to receive residual data (e.g., residual data for a luma CB and each of two chroma CBs) and generate transform coefficients based on a TU structure according to a core transform. FIG. 4 illustrates an example of generating transform coefficients based on a TU structure according to a core transform. In the example illustrated in FIG. 4, for a 16×16 CU of residual data, a core transform is applied to each 8×8 array of residual sample value, (e.g., there are four 8×8 TUs within a 16×16 CU). Further, as illustrated in FIG. 4, each resulting 8×8 set of transform coefficients generated using a core transform may be divided into a plurality of sub-blocks (e.g., 4×4 sublocks, $SB_{0,0} \ldots SB_{1,1}$). As described above, a secondary transform, e.g., the NSST described above with respect to JEM, may be applied to a sub-block of transform coefficients.

Referring again to FIG. 3, secondary transform determination unit 304 may be configured to determine whether a secondary transform is applied to a sub-block of transform coefficients. Further, in the case whether a secondary transform is associated with multiple transform matrices, secondary transform determination unit 304 may be configured to determine a transform matrix for a secondary transform. In the example illustrated in FIG. 3, secondary transform coefficient generator 306 receives core transform coefficients corresponding to a TU and a transform matrix associated with a secondary transform and generates secondary transform coefficients for each sub-block of transform coefficients. In the example illustrated in FIG. 3, secondary transform determination unit 304 receives core transform coefficients, intra predication data, and a quantization parameter. Thus, secondary transform determination unit 304 may be configured to determine whether a secondary transform is performed and a transform matrix for a secondary transform based on an intra predication data, a quantization parameter, and/or values of the transform coefficients generated using a core transform for each TU (i.e., each TU with a set of $TU_{0,0} \ldots TU_{N,N}$).

For example, secondary transform determination unit 304 may determine a number of transform coefficients generated using a core transform that are zero for a TU. In one example, if the number of transform coefficients generated using a core transform having a value of zero exceeds a threshold, secondary transform determination unit 304 may determine that a secondary transform is not preformed. For example, for an 8×8 TU, secondary transform determination unit 304 may determine that a secondary transform is not performed for the TU if the number of zero coefficients is greater than 16. In some examples, the threshold for determining whether a secondary transform is performed based on the number of transforms coefficient values being zero may be based on the quantization parameter. For example, a relatively high quantization parameter (i.e., indicating a relatively high-level of data loss due to quantization) may cause the threshold to decrease (e.g., be reduced from 16 to 8, etc.). Similarly, a relatively low quantization parameter (i.e., indicating a relatively low-level of data loss due to quantization) may cause the threshold to increase (e.g., be increased from 16 to 24, etc.). Further, in some examples, secondary transform determination unit 304 may determine whether a secondary transform is performed based on the number of transform coefficients being less than a threshold value (e.g., less than 10, etc.). In some examples, this threshold value may be based on the quantization parameter. Further, in some examples, secondary transform determination unit 304 may determine whether a secondary transform is performed for a TU based on transform coefficient of a neighboring CU. For example, referring to FIG. 4, a determination whether a secondary transform is applied for transform coefficients included in $TU_{1,0}$ may be based on whether the number of zero value transform coefficients in $TU_{0,0}$ exceeds a threshold. Similarly, the other threshold conditions described above may be applied to any of one or more of $TU_{0,0}$, $TU_{1,0}$, $TU_{0,1}$, and $TU_{1,1}$, to determine if a secondary transform is applied and/or a matrix used for a secondary transform for any of $TU_{0,0}$, $TU_{1,0}$, $TU_{0,1}$, and $TU_{1,1}$.

Further, it should be noted that in other examples, secondary transform determination unit 304 may receive other properties and/or parameters associated with a CU and determine whether a secondary transform is performed for a TU and/or a transform matrix for a secondary transform based on properties and/or parameters associated with a CU. For example, secondary transform determination unit 304 may be configured to determine that a secondary transform is only performed in the case where a CU or TUs thereof exceed a minimum size (or depth). For example, secondary transform determination unit 304 may be configured to determine that secondary transform is only performed in the case where a CU is greater than or equal to 16×16. Further, in some examples, secondary transform determination unit 304 may be configured to determine whether a secondary transform is performed for a TU and/or determine a transform matrix for a secondary transform based on properties of an intra predication mode associated with CU. For example, secondary transform determination unit 304 may be configured to determine that a secondary transform is not performed in the case where PDPC is applied and/or determine that a secondary transform is not performed based on the partitioning type of a CU.

As illustrated in FIG. 3, secondary transform determination unit 304 may output secondary transform data. As illustrated in FIG. 2, transform data may be received entropy encoding unit 216 and output as part of a bitstream. Thus, secondary transform data may include one or more syntax elements that may be used to indicate if a secondary transform is performed and indicate a transform matrix for a secondary transform at a video decoder. In one example, secondary transform data may include a CU-level flag syntax element (e.g., a one-bit syntax element cu_nsst_flag) indicating whether a secondary transform may be applied to one or more TUs with the CU and for each TU within the CU a TU-level index syntax element (e.g., a two-bit syntax element tu_nsst_idx) indicating a matrix for a secondary transform and/or indicating whether a secondary transform is applied for the TU. For example, tu_nsst_idx may have values similar to the 2-bit CU-level index value described above with respect to JEM. It should be noted that in this example, tu_nsst_idx may be conditionally signaled based on the value of cu_nsst_flag. That is, for example, if cu_nsst_flag indicates that performance of secondary transforms is disabled for the CU, tu_nsst_idx are not signaled. It should be noted that in other examples, a condition that may be determined from properties and/or parameters associated with a CU may be used as an alternative to cu_nsst_flag. For example, a QP value associated with a CU and a QP threshold value may be used to determine if performance of secondary transforms is enabled for the CU (e.g., if QP value>QP threshold, secondary transforms are disabled). In one example, CU size may be used to infer a value of cu_nsst_flag. For example, if CU size is larger than predefined size (e.g., larger than 64×64) then cu_nsst_flag may be inferred to be zero and not signaled in this case.

In one example, secondary transform data may include a CU-level index syntax element (e.g., a two-bit syntax element cu_nsst_idx) indicating a matrix for a secondary transform and/or indicating whether a secondary transform is applied for the CU and for each TU within the CU, a TU-level flag syntax element (e.g., a one-bit syntax element tu_nsst_flag) indicating whether a secondary transform is be applied for a TU. For example, cu_nsst_idx may have values similar to the 2-bit CU-level index value described above with respect to JEM. It should be noted that in this example, tu_nsst_flag may be conditionally signaled based on the value of cu_nsst_idx. That is, for example, if cu_nsst_idx indicates that performance of secondary transforms is disabled for the CU, tu_nsst_flag is not signaled. It should be noted that in other examples, a condition that may be determined from properties and/or parameters associated with a CU may be used to infer a value of cu_nsst_idx. For example, a QP value associated with a CU and a QP threshold value may be used to determine if performance of secondary transforms is enabled for the CU (e.g., if QP value>QP threshold, secondary transforms are disabled e.g., cu_nsst_idx equals zero).

As described above, tu_nsst_flag and tu_nsst_idx may be conditionally signaled based on the value of cu_nsst_idx and cu_nsst_flag and/or properties or parameters associated with a CU. For example, tu_nsst_flag and tu_nsst_idx may be signaled when cu_nsst_idx and cu_nsst_flag is not equal to zero. Further, in some examples, tu_nsst_flag and tu_nsst_idx may be conditionally signaled based on properties or parameter associated with a TU. For example, a partition type (e.g., N×N or 2N×2N, i.e., the two TU partitioning modes for intra predications as described in ITU-T H.265) associated with a TU may be used to determine whether tu_nsst_flag and tu_nsst_idx are signaled for a TU. Further, in some examples, for each TB, whether tu_nsst_flag and tu_nsst_idx are signaled may be based on whether a TB is a skip transform block (e.g., syntax element transform_skip_flag defined in ITU-T H.265 equals 1, indicates tu_nsst_flag and tu_nsst_idx are not signaled) and/or the component type (luma) of a TB. In one example, tu_nsst_flag and tu_nsst_idx may be signaled for a luma component and inferred for chroma components based on the value signaled for the luma component.

Further, in one example, properties of one or more syntax elements that are included in secondary transform data may be based on properties and/or parameters associated with a CU. For example, a range of index values may be based on whether, PDPC is applied, a size or bit-depth associated with a CU, a quantization parameter associated with a CU, and/or combinations thereof. For example, in the case where secondary transform data includes cu_nsst_flag and tu_nsst_idx, tu_nsst_idx may have a range of 0 to 1 (e.g., include 1-bit) or a range of 0 to 3 (e.g., include 2-bits) based on whether properties and/or parameters associated with a CU satisfy a condition. In this example, a condition may be include whether PDPC is applied AND whether the CU size is greater than 16×16 (e.g., tu_nsst_idx has a range of 0 to 3 when the condition is satisfying and a range of 0 to 1 when the condition is not satisfied). In a similar manner, the range of syntax element cu_nsst_idx may be based on properties and/or parameters associated with a CU. It should be noted that a binarization used for a syntax element may be based on the range of values of a syntax element. For example, in the case where an index indicates one of four values, it may be binarized using a truncated unary binarization. Thus, properties and/or parameters associated with a CU may be used to determine the binarization of one or more syntax elements that are included in secondary transform data.

Figure 5:
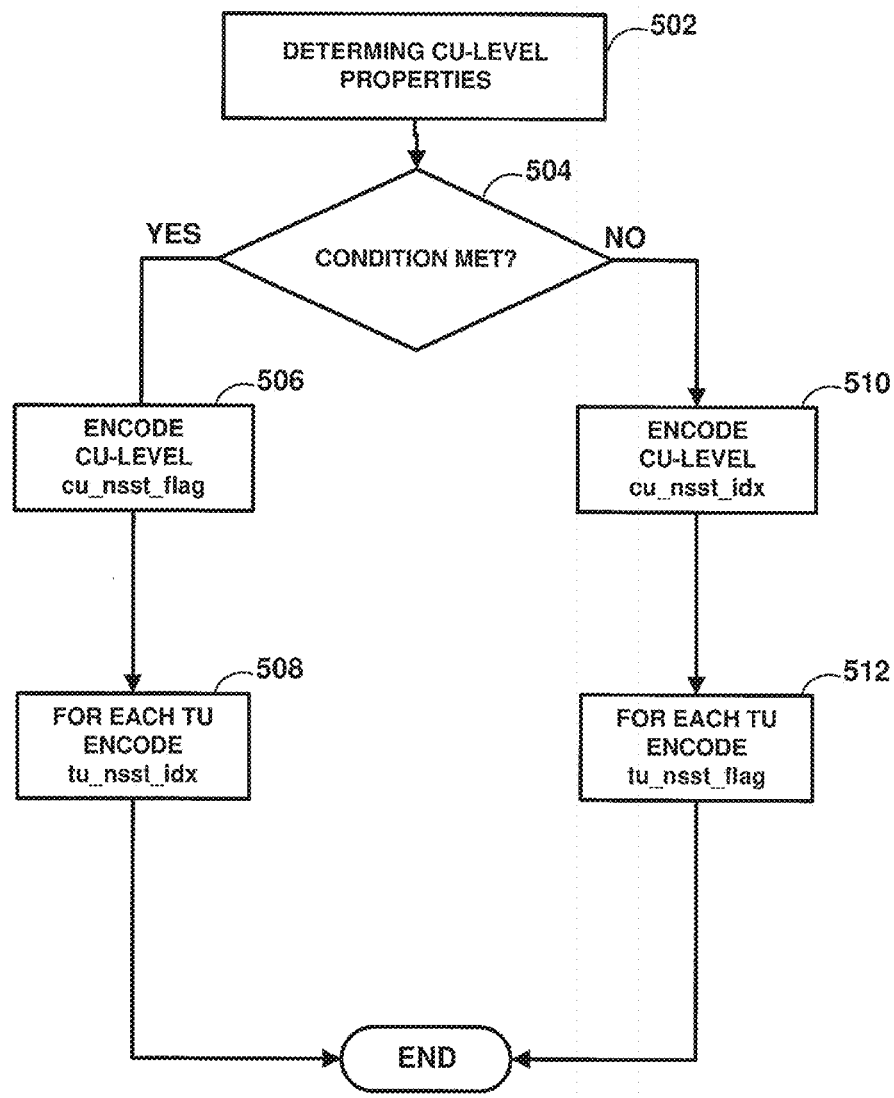
FIG. 5 is a flowchart illustrating encoding transform coefficient data according to one or more techniques of this disclosure.

Further, in one example, in a manner similar to determining a range of index values may be based on properties and/or parameters associated with a CU, secondary transform determination unit 304 may be configured to generate different sets syntax elements that are included in secondary transform data based on properties and/or parameters associated with a CU. FIG. 5 is a flowchart illustrating an example, where secondary transform determination unit 304 uses cu_nsst_flag and tu_nsst_idx syntax elements, as described above, to indicate whether a secondary transform is applied and a transform matrix for a secondary matrix for each TU in a CU, if the CU properties meet a condition or uses cu_nsst_idx and tu_nsst_flag syntax elements, as described above to indicate whether a secondary transform is applied and a transform matrix for a secondary matrix for each TU in the CU, if CU properties do not meet the condition. Referring to FIG. 5, secondary transform determination unit 304 determines one or more properties of a CU (502). Secondary transform determination unit 304 determines whether the one or more properties satisfy a condition (504). Upon determining that the properties satisfy a condition, secondary transform determination unit 304 encodes a value for a CU level secondary transform flag (506) and encodes a TU level index value for each TU in the CU (508). Upon determining that the properties do not satisfy the condition, secondary transform determination unit 304 encodes a TU level index value (510) and encodes a TU level flag value for each TU in the CU (512). In this manner, video encoder may be configured to signal secondary transform syntax elements based on conditions determined based on the properties of a CU. It should be noted that in other examples, higher level (e.g., slice or picture, etc.) may be used to determine how secondary transform syntax elements are signaled.

As described above, in ITU-T H.265, N×N and 2N×2N TU partitioning modes are defined for intra predications. In ITU-T H.265, for an N×N mode there may be four equally sized TBs for the luma CB, a single TB for a first chroma component CB (e.g., Cb), and a single TB for a second chroma component CB (e.g., Cr). In ITU-T H.265, for a 2N×2N mode there is a single TB for a luma component CB, a single TB for a first chroma component CB (e.g., Cb), and a single TB for a second chroma component CB (e.g., Cr). Referring again to FIG. 4, the example illustrated in FIG. 4 may correspond to an N×N intra mode TU structure for the CU, that is each of $TU_{0,0}$, $TU_{1,0}$, $TU_{0,1}$, and $TU_{1,1}$ may correspond to respective luma transform blocks and for each chroma component, a single TU may correspond to a respective chroma component CB. As described above, transform coefficient generator 300 outputs core transform coefficients or secondary transform coefficients for each of the TUs forming a CU. Further, secondary transform data may include one or more syntax elements that may be used to indicate if a secondary transform is performed and a transform matrix for a secondary transform (e.g., a cu_nsst_idx for a CU and a tu_nsst_flag for each TU).

FIGS. 6A-6B illustrate examples of pseudocode that may be used to generate syntax for video coding according to one or more techniques of this disclosure. The example illustrated in FIG. 6A corresponds to syntax associated with an N×N mode and corresponds to the CU illustrated in the example of FIG. 4. As illustrated in FIG. 6A, a CU-level flag or index is conditionally signaled based on parameters associated with the CU. Examples of conditions that may be determined based on parameters associated with a CU are described above. For example, a condition may be based on whether PDPC is applied and/or whether the CU size is greater than 16×16. As further illustrated in FIG. 6A, for each TB of the luma component, TB transform coefficients are signaled and a corresponding TU-level index or flag is conditionally signaled based on parameters associated with the TU (e.g., a skip transform block indication) and for each TB of the chroma components TB transform coefficients are signaled. FIG. 6B illustrates an example of pseudocode that may be used to generate syntax in the case where a 2N×2N mode is used. As illustrated in FIG. 6B, a CU-level flag or index is conditionally signaled based on parameters associated with the CU. As further illustrated in FIG. 6B, for the TB of the luma component, TB transform coefficients are signaled and a corresponding TU-level index or flag is conditionally signaled based on parameters associated with the TU and for each TB of the chroma components, TB transform coefficients are signaled.

It should be noted that the order in which transform coefficients and syntax elements are output to an entropy encoder for entropy encoding may impact entropy encoding performance. For example, CABAC entropy encoding may be improved, if elements having a relatively high correlation with respect to their values are grouped together. In this manner, when the example pseudocode illustrated in FIGS. 6A-6B is used to generate syntax for video coding (e.g., for implementing a video encoder configured to generate a compliant bitstream), the sequence of syntax elements may be modified to improve performance. For example, in the case of the example illustrated in FIG. 6A, all of the transform coefficients for all of the luma TBs may be signaled before any of the luma TU flags (or indices) are signaled. As described in further detail below, a video decoder may be configured to parse syntax elements and transform coefficients generated by transform coefficient generator 300 according to one or more techniques of this disclosure.

Figure 7:
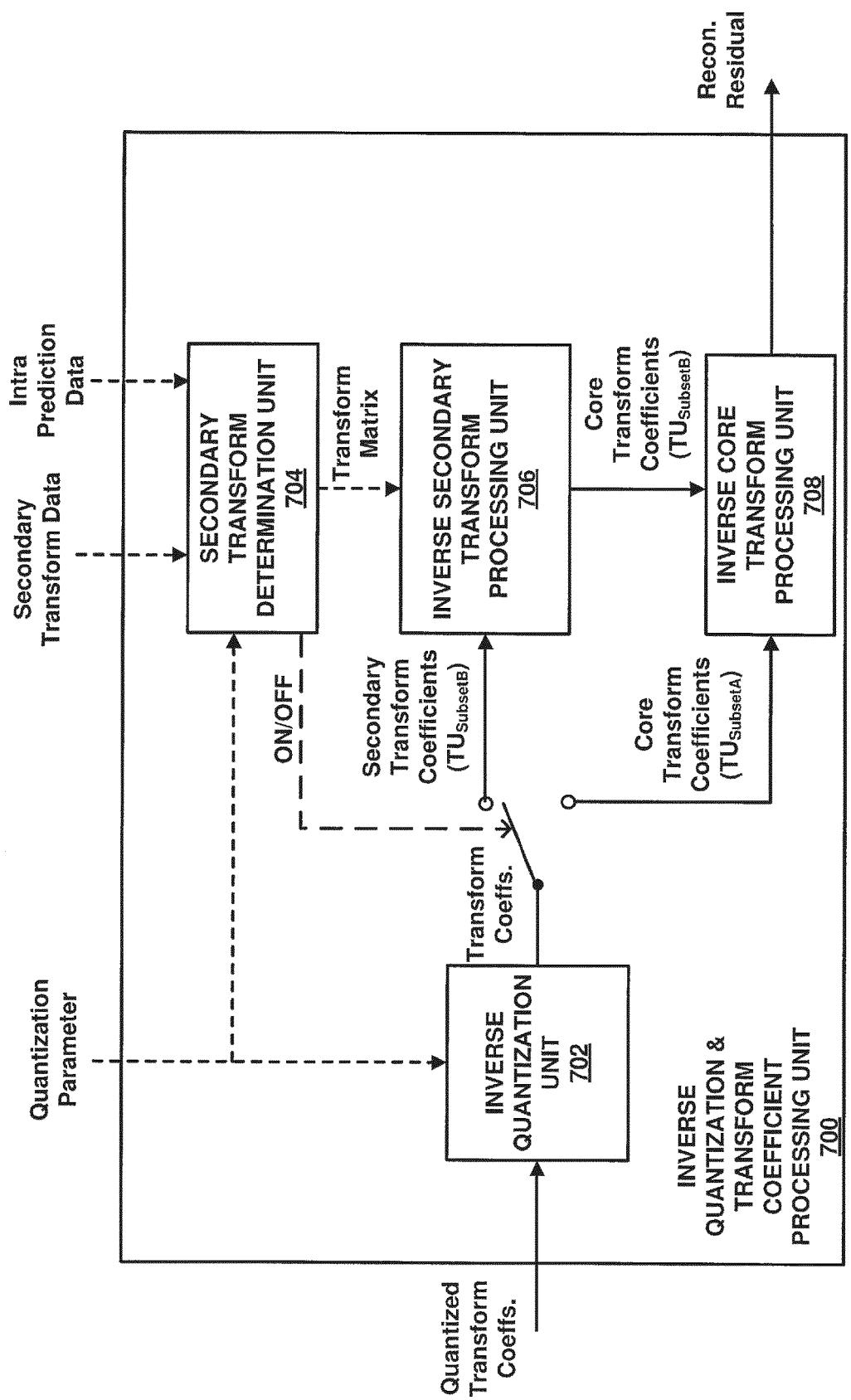
FIG. 7 is a block diagram illustrating an example of an inverse quantization and transform coefficient processing unit that may be configured to code video data according to one or more techniques of this disclosure.

As described above, with respect to FIG. 2, an inverse quantization and transform coefficient processing unit may be configured to apply an inverse quantization and an inverse transformation to generate reconstructed residual data. FIG. 7 is a block diagram illustrating an example of an inverse quantization and transform coefficient processing unit that may be configured to code video data according to one or more techniques of this disclosure. As illustrated in FIG. 7, inverse quantization and transform coefficient processing unit 700 includes inverse quantization unit 702, secondary transform determination unit 704, inverse secondary transform processing unit 706, and inverse core transform processing unit 708. Inverse quantization unit 702 may be configured to receive a quantization parameter and quantized transform coefficients, including transform coefficients generated using a core transform and transform coefficients generated according to a subsequent secondary transform, as described above, and apply an inverse quantization to recover transform coefficients. Secondary transform determination unit 704 may be configured to receive a quantization parameter, secondary transform data (e.g., values corresponding to cu_nsst_flag and tu_nsst_idx), and intra predication data and determine a transform matrix corresponding to a secondary transform. It should be noted that secondary transform determination unit 704 may operation in a manner similar to secondary transform determination unit 304 described above. It should also be noted that in some examples, for particular video encoder implementations, secondary transform determination unit 704 and secondary transform determination unit 304 may access quantization parameter, secondary transform data and intra predication data from different portions of a memory associated with a video encoder.

Inverse secondary transform processing unit 706 may be configured to receive secondary transform coefficients and a transform matrix and perform an inverse secondary transform to generate core transform coefficients. That is, inverse secondary transform processing unit 706 may operate in a reciprocal manner to secondary transform coefficient generator 306. Inverse transform processing unit 708 may be configured to receive core transform coefficients, from inverse quantization unit 702 (in the case where a secondary transform is not performed for a TU) and inverse secondary transform processing unit 706 (in the case where a secondary transform is performed for a TU) and perform an inverse core transform to generate reconstructed residual data. That is, inverse core transform processing unit 708 may operate in a reciprocal manner to core transform coefficient generator 302. It should be noted that inverse quantization and transform coefficient processing unit 700 may be included in video encoder as part of a decode loop or in a video decoder to reconstruct residual data from a compliant bitstream.

Referring again to FIG. 2, intra prediction processing unit 212 may be configured to select an intra prediction mode for a video block to be coded. Intra prediction processing unit 212 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 212 may select an intra prediction mode after performing one or more coding passes. Further, in one example, intra prediction processing unit 212 may select a prediction mode based on a rate-distortion analysis. As illustrated in FIG. 2, intra prediction processing unit 212 outputs intra prediction data (e.g., syntax elements) to entropy encoding unit 216 and transform coefficient generator 204. As described above, a transform performed on residual data may be mode dependent (e.g., a secondary transform matrix may be determined based on a predication mode).

Referring again to FIG. 2, inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 2). It should be noted that inter prediction processing unit 214 may further be configured to apply one or more interpolation filters to a reconstructed residual block to calculate subinteger pixel values for use in motion estimation. Inter prediction processing unit 214 may output motion prediction data for a calculated motion vector to entropy encoding unit 216.

Referring again to FIG. 2, entropy encoding unit 218 receives quantized transform coefficients and predictive syntax data (i.e., intra prediction data and motion prediction data). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder represents an example of a device configured to generate transform coefficients and signal transform data according to one or more techniques of this disclose.

Figure 8:
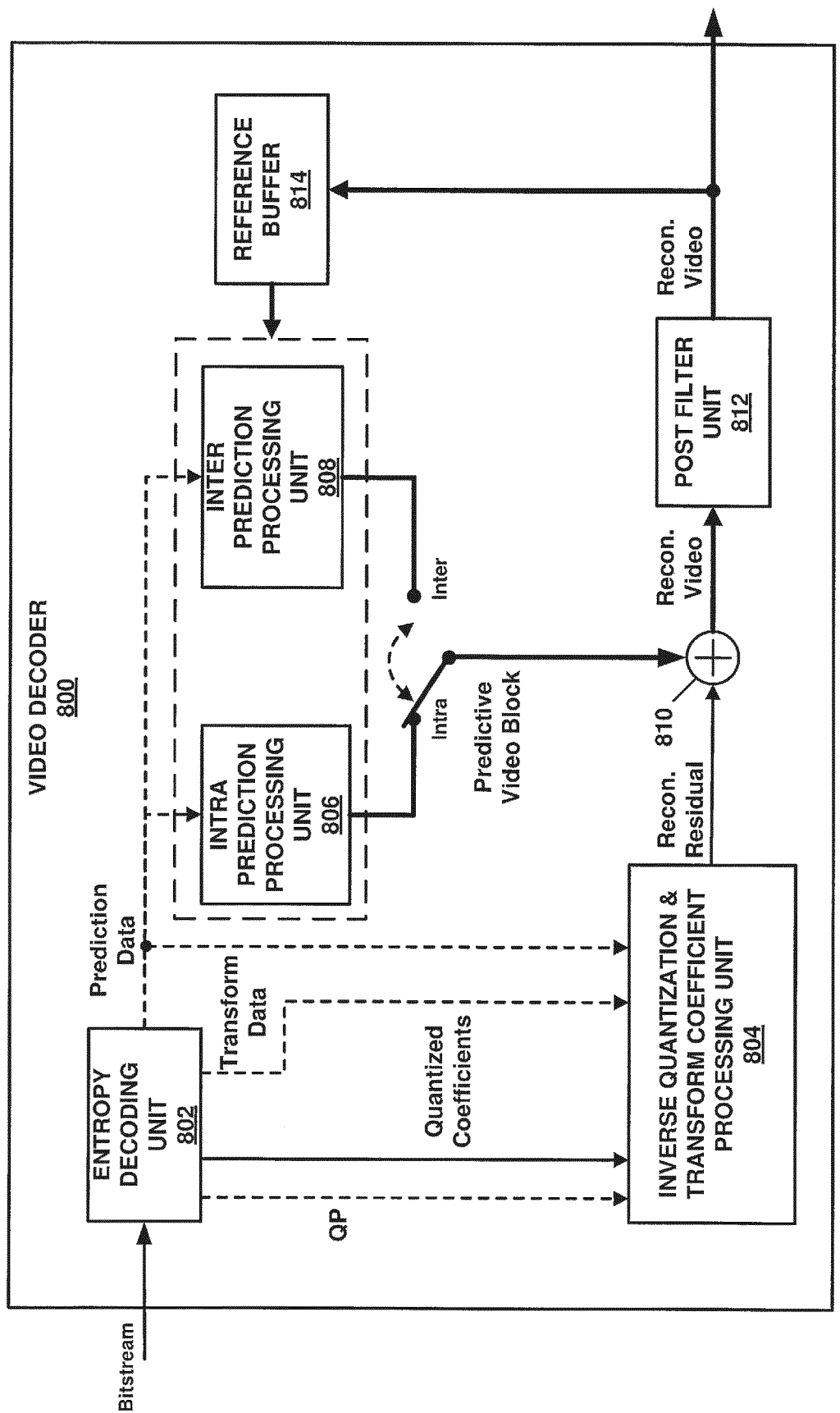
FIG. 8 is a block diagram illustrating an example of a video decoder that may be configured to decode video data according to one or more techniques of this disclosure.

FIG. 8 is a block diagram illustrating an example of a video decoder that may be configured to decode video data according to one or more techniques of this disclosure. In one example, video decoder 800 may be configured to decode transform data and reconstruct residual data from transform coefficients based on decoded transform data. Video decoder 800 may be configured to perform intra prediction decoding and inter prediction decoding and, as such, may be referred to as a hybrid decoder. In the example illustrated in FIG. 8, video decoder 800 includes an entropy decoding unit 802, inverse quantization unit and transform coefficient processing unit 804, intra prediction processing unit 806, inter prediction processing unit 808, summer 810, post filter unit 812, and reference buffer 814. Video decoder 800 may be configured to decode video data in a manner consistent with a video coding system. It should be noted that although example video decoder 800 is illustrated as having distinct functional blocks, such an illustration is for descriptive purposes and does not limit video decoder 800 and/or sub-components thereof to a particular hardware or software architecture. Functions of video decoder 800 may be realized using any combination of hardware, firmware, and/or software implementations.

As illustrated in FIG. 8, entropy decoding unit 802 receives an entropy encoded bitstream. Entropy decoding unit 802 may be configured to decode syntax elements and quantized coefficients from the bitstream according to a process reciprocal to an entropy encoding process. Entropy decoding unit 802 may be configured to perform entropy decoding according any of the entropy coding techniques described above. Entropy decoding unit 802 may determine values for syntax elements in an encoded bitstream in a manner consistent with a video coding standard. As illustrated in FIG. 8, entropy decoding unit 802 may determine a quantization parameter, quantized coefficient values, transform data, and predication data from a bitstream. In the example, illustrated in FIG. 8, inverse quantization unit and transform coefficient processing unit 804 receives a quantization parameter, quantized coefficient values, transform data, and predication data from entropy decoding unit 802 and outputs reconstructed residual data. Inverse quantization unit and transform coefficient processing unit 804 may operate in a manner similar to inverse quantization unit and transform coefficient processing unit 700 described above and for the sake of brevity, a detailed description of generating reconstructed residual data from a quantization parameter, quantized coefficient values, transform data, and/or predication data is not repeated.

Video decoder 800 (e.g., entropy decoding unit 802 and/or inverse quantization unit and transform coefficient processing unit 804) may be configured to parse syntax elements and transform coefficients generated by transform coefficient generator 300 based on the example pseudocode described above with respect to FIGS. 6A-6B. That is, video decoder 800 may be configured to conditionally parse one or more syntax elements forming secondary transform data based on CU properties and/or TU properties.

Further, in the case of where a CU corresponds to an intra prediction N×N partition mode, in one example, video decoder 800 may be configured to generate a value based on whether secondary transforms are performed for one or more TUs. In one example, the value may be used by video decoder to perform one or more decoding operations. Referring to the example illustrated in FIG. 4, each of $TU_{0,0}$, $TU_{1,0}$, $TU_{0,1}$, and $TU_{1,1}$ may be associated with a respective value that may be added to a TU_MAP value based on whether a secondary transform is applied to a TU. In one example, $TU_{0,0}$ may be associated with a value of 16, $TU_{1,0}$ may be associated with a value of 8, $TU_{0,1}$ may be associated with a value of 4, and $TU_{1,1}$ may be associated with a value of 2. It should be noted that in other examples, values may be determined based on a particular scan order (zig-zag, horizontal, vertical, etc.). Table 3A provides an example of unique TU_MAP values that may be generated by video decoder 800 based a secondary transform being used to generate coefficients for one or more of $TU_{0,0}$, $TU_{1,0}$, $TU_{0,1}$, and $TU_{1,1}$. In one example, the value of TU_MAP may be reset to zero for each subsequent CU in a decoding process.

TABLE 3A

| TU_MAP Value | $TU_{0,0}$ | $TU_{1,0}$ | $TU_{0,1}$ | $TU_{1,1}$ |
|---|---|---|---|---|
| 16 | ON | OFF | OFF | OFF |
| 8 | OFF | ON | OFF | OFF |
| 4 | OFF | OFF | ON | OFF |
| 2 | OFF | OFF | OFF | ON |
| 24 (16 + 8) | ON | ON | OFF | OFF |
| 20 (16 + 4) | ON | OFF | ON | OFF |
| 20 (16 + 4) | ON | OFF | OFF | ON |
| 28 (16 + 8 + 4) | ON | ON | ON | OFF |
| 26 (16 + 8 + 2) | ON | ON | OFF | ON |
| 22 (16 + 4 + 2) | ON | OFF | ON | ON |
| 30 (16 + 8 + 4 + 2) | ON | ON | ON | ON |
| 12 (8 + 4) | OFF | ON | ON | OFF |
| 10 (8 + 2) | OFF | ON | OFF | ON |
| 6 (4 + 2) | OFF | OFF | ON | ON |
| 14 (8 + 4 + 2) | OFF | ON | ON | ON |
| 0 | OFF | OFF | OFF | OFF |

Further, in one example, video decoder 800 may parse syntax elements forming secondary transform data and/or reconstruct residual values based on a value of TU_MAP. In one example, a value of TU_MAP may be reduced based on whether a video decoder 800 has performed a particular operation (e.g., parsed a particular syntax element and/or reconstructed residual data for a particular TU), FIG. 9 is a conceptual drawing illustrating an example of pseudocode that may be used to parse syntax elements used for video coding according to one or more techniques of this disclosure. Video decoder 800 may parse tu_nsst_idx values based on the particular values of TU_MAP. Comparing the example pseudocode illustrated in FIG. 6A and the example pseudocode illustrated in FIG. 9, video decoder 800 may determine condition (TU_MAP>15) in FIG. 9 based on a syntax element based on $TU_{0,0}$_IDX_OR_FLAG illustrated in FIG. 6A. In one example, video decoder 800 may reconstruct residual data for $TU_{0,0}$ before parsing any additional syntax elements illustrated in FIG. 6A. In other examples, video decoder 800 may prioritize video decoding operations in another manner based on a current value of TU_MAP.

Table 3B illustrated an example, where video decoder prioritizes how residual data is reconstructed for a CU based on values of TU_MAP. In this manner, video decoder 800 may be configured to perform decoding operations based on secondary transform data.

TABLE 3B

| TU_MAP Value | $TU_{0,0}$ | $TU_{1,0}$ | $TU_{0,1}$ | $TU_{1,1}$ | TRANSFORM PROCESSING PRIORITY |
|---|---|---|---|---|---|
| 16 | ON | OFF | OFF | OFF | $TU_{0,0}$ secondary inverse |
| 8 | OFF | ON | OFF | OFF | $TU_{1,0}$ secondary inverse |
| 4 | OFF | OFF | ON | OFF | $TU_{0,1}$ secondary inverse |
| 2 | OFF | OFF | OFF | ON | $TU_{1,1}$ secondary inverse |
| 24 (16 + 8) | ON | ON | OFF | OFF | $TU_{0,0}$ secondary inverse |
| 20 (16 + 4) | ON | OFF | ON | OFF | $TU_{0,0}$ secondary inverse |
| 20 (16 + 4) | ON | OFF | OFF | ON | $TU_{0,0}$ secondary inverse |
| 28 (16 + 8 + 4) | ON | ON | ON | OFF | $TU_{0,0}$ secondary inverse |
| 26 (16 + 8 + 2) | ON | ON | OFF | ON | $TU_{0,0}$ secondary inverse |
| 22 (16 + 4 + 2) | ON | OFF | ON | ON | $TU_{0,0}$ secondary inverse |
| 30 (16 + 8 + 4 + 2) | ON | ON | ON | ON | $TU_{0,0}$ secondary inverse |
| 12 (8 + 4) | OFF | ON | ON | OFF | $TU_{1,0}$ secondary inverse |
| 10 (8 + 2) | OFF | ON | OFF | ON | $TU_{1,0}$ secondary inverse |
| 6 (4 + 2) | OFF | OFF | ON | ON | $TU_{0,1}$ secondary inverse |
| 14 (8 + 4 + 2) | OFF | ON | ON | ON | $TU_{1,0}$ secondary inverse |
| 0 | OFF | OFF | OFF | OFF | $TU_{0,0}$ core inverse |

Referring again to FIG. 8, reconstructed residual data may be provided to summer 810 Summer 810 may add reconstructed residual data to a predictive video block and generate reconstructed video data. A predictive video block may be determined according to a predictive video technique (i.e., intra prediction and inter frame prediction). Intra prediction processing unit 806 may be configured to receive intra prediction syntax elements and retrieve a predictive video block from reference buffer 814. Reference buffer 814 may include a memory device configured to store one or more frames of video data. Intra prediction syntax elements may identify an intra prediction mode, such as the intra prediction modes described above. Inter prediction processing unit 808 may receive inter prediction syntax elements and generate motion vectors to identify a prediction block in one or more reference frames stored in reference buffer 814. Inter prediction processing unit 808 may produce motion compensated blocks, possibly performing interpolation based on interpolation filters. Identifiers for interpolation filters to be used for motion estimation with sub-pixel precision may be included in the syntax elements. Inter prediction processing unit 808 may use interpolation filters to calculate interpolated values for sub-integer pixels of a reference block. Post filter unit 812 may be configured to perform filtering on reconstructed video data. For example, post filter unit 812 may be configured to perform deblocking and/or Sample Adaptive Offset (SAO) filtering, e.g., based on parameters specified in a bitstream. Further, it should be noted that in some examples, post filter unit 812 may be configured to perform proprietary discretionary filtering (e.g., visual enhancements, such as, mosquito noise reduction). As illustrated in FIG. 8, a reconstructed video block may be output by video decoder 800. In this manner, video decoder 800 may be configured to generate reconstructed video data according to one or more of the techniques described herein. In this manner video decoder 800 may be configured to be configured to decode transform data and reconstruct residual data from transform coefficients based on decoded transform data according to one or more techniques of this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

Overview

In one example, a method of encoding transform data comprises determining whether a secondary transform is applied to a sub-group of transforms coefficients, signaling a syntax element indicating a whether the secondary transform is applied to the sub-group of transforms coefficients, and signaling a syntax element indicating a matrix for the secondary transform based on the value of a syntax element indicating a whether the secondary transform is applied to the sub-group of transforms coefficients.

In one example, a device for video coding comprises one or more processors configured to determine whether a secondary transform is applied to a sub-group of transforms coefficients, signal a syntax element indicating a whether the secondary transform is applied to the sub-group of transforms coefficients, and signal a syntax element indicating a matrix for the secondary transform based on the value of a syntax element indicating a whether the secondary transform is applied to the sub-group of transforms coefficients.

In one example, a non-transitory computer-readable storage medium comprises instructions stored thereon that, when executed, cause one or more processors of a device to determine whether a secondary transform is applied to a sub-group of transforms coefficients, signal a syntax element indicating a whether the secondary transform is applied to the sub-group of transforms coefficients, and signal a syntax element indicating a matrix for the secondary transform based on the value of a syntax element indicating a whether the secondary transform is applied to the sub-group of transforms coefficients.

In one example, an apparatus comprises means for determining whether a secondary transform is applied to a sub-group of transforms coefficients, means for signaling a syntax element indicating a whether the secondary transform is applied to the sub-group of transforms coefficients, and means for signaling a syntax element indicating a matrix for the secondary transform based on the value of a syntax element indicating a whether the secondary transform is applied to the sub-group of transforms coefficients.

In one example, a method for decoding video data comprise receiving secondary transform data and reconstructing residual data based on secondary transform data.

In one example, a device for decoding video data comprises one or more processors configured to receive secondary transform data and reconstruct residual data based on secondary transform data.

In one example, a non-transitory computer-readable storage medium comprises instructions stored thereon that, when executed, cause one or more processors of a device for decoding video data to receive secondary transform data and reconstruct residual data based on secondary transform data.

In one example, an apparatus for decoding video data comprises means for receiving secondary transform data and means for reconstructing residual data based on secondary transform data.

The details of one or more examples are set forth in the accompanying drawings and the description below. Other features, objects, and advantages will be apparent from the description and drawings, and from the claims.

The invention claimed is:

1. A method of encoding transform data for video coding based on intra prediction techniques, the method comprising:
   determining a condition being associated with a coding unit; and
   signaling a coding unit level index syntax element indicating (a) whether a secondary transform is applied and (b) which matrix for the secondary transform is used, based on the condition; and
   inferring the coding unit level index syntax element to be equal to 0, which indicates that the secondary transform is not applied,
   wherein the condition includes at least (a) the coding unit being greater than or equal to 16×16, and (b) a determination that an intra prediction technique for generating a predictive video block using a weighted combination of reference samples is not applied for generating a predictive video block for the coding unit.

2. A method of decoding transform data for video coding based on intra prediction techniques, the method comprising:
   determining a condition being associated with a coding unit;
   parsing a coding unit level index syntax element indicating (a) whether a secondary transform is applied and (b) which matrix for the secondary transform is used, based on the condition; and
   inferring the coding unit level index syntax element to be equal to 0, which indicates that the secondary transform is not applied, wherein the condition includes at least (a) the coding unit being greater than or equal to 16×16, and (b) a determination that an intra prediction technique for generating a predictive video block using a weighted combination of reference samples is not applied for generating a predictive video block for the coding unit.

3. A device comprising one or more processors configured to:

determine a condition being associated with a coding unit;

parse a coding unit level index syntax element indicating (a) whether a secondary transform is applied and (b) which matrix for the secondary transform is used, based on the condition; and infer the coding unit level index syntax element to be equal to 0, which indicates that the secondary transform is not applied, wherein the condition includes at least (a) the coding unit being greater than or equal to 16×16, and (b) a determination that an intra prediction technique for generating a predictive video block using a weighted combination of reference samples is not applied for generating a predictive video block for the coding unit.

4. The device of claim 3, wherein the device includes a video decoder.

* * * * *